Sept. 17, 1940.	H. L. HULL	2,215,153
TIRE PRESSURE INDICATOR SWITCH
Filed Nov. 1, 1938
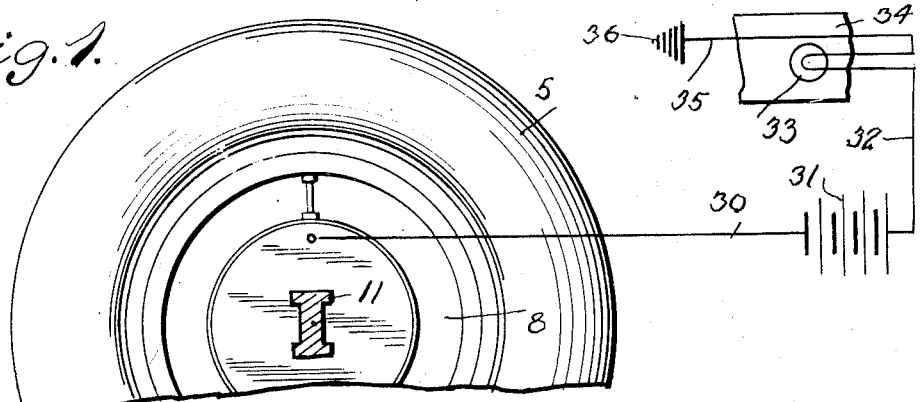
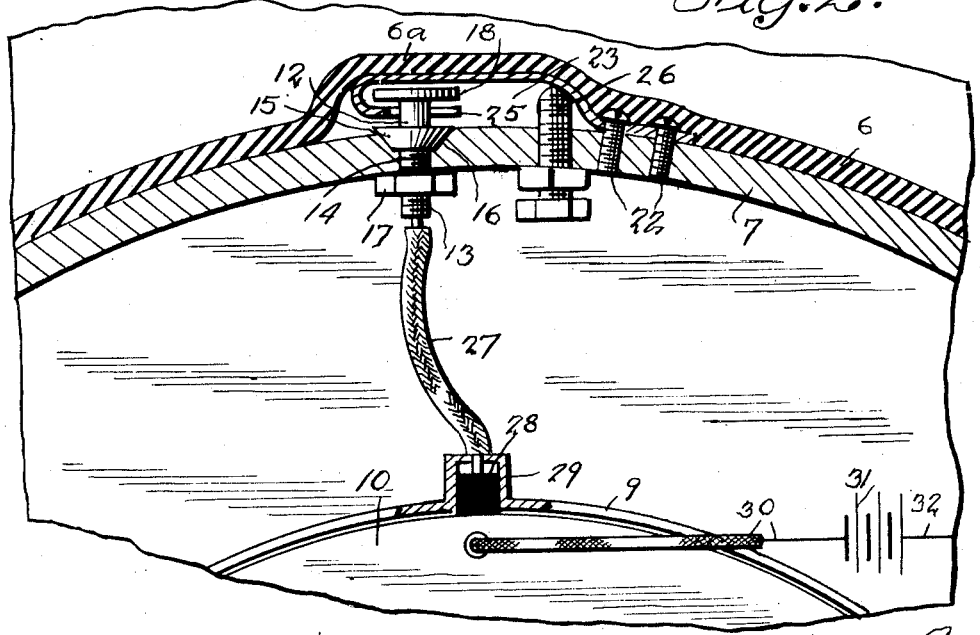
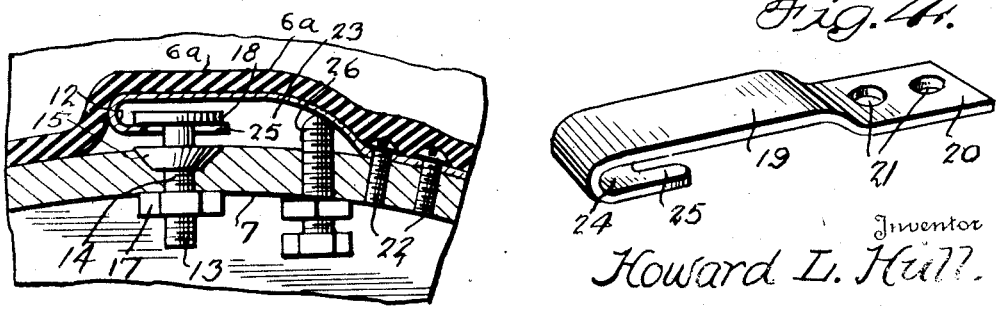
Inventor
Howard L. Hull.
By
A. Manuel, Attorney.

Patented Sept. 17, 1940

2,215,153

UNITED STATES PATENT OFFICE 2,215,153

TIRE PRESSURE INDICATOR SWITCH

Howard L. Hull, Anderson, Ind.

Application November 1, 1938, Serial No. 238,256

1 Claim. (Cl. 200—58)

This invention relates to certain new and useful improvements in tire pressure indicator switches.

The primary object of the invention is to provide a tire pressure indicator switch controlling the operation of a signal, preferably a lamp, to indicate when the air pressure in a motor vehicle tire exceeds or falls below a predetermined amount so that the operator of the vehicle would be aware at all times of the air pressure conditions of the tire.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a fragmentary side elevational view of a motor vehicle wheel, the axle thereof being shown in section together with a part of the wiring arrangement and signal lamp indicating high and low tire pressures, Figure 2 is an enlarged fragmentary sectional view showing the switch device mounted upon the wheel rim and exteriorly of the inner tube of the tire and in its open position, Figure 3 is a detail sectional view, similar to Figure 2, showing the switch device in its extended position in contact with a terminal responsive to low tire pressure, and Figure 4 is a perspective view of the switch device or arm.

Referring more in detail to the accompanying drawing, the reference character 5 designates a pneumatic tire shoe housing an inner tube 6 and mounted upon a wheel rim 7, the rim being anchored to the wall 8 of the wheel that includes a circular flange 9 extending over a stationary element of the wheel assembly such as a casing or brake drum 10. The wheel is illustrated in Figure 1 as being mounted on an axle 11.

An electric terminal comprising a stem 12 has the lower end thereof threaded as at 13 for passage through an opening 14 in the wheel rim 7, the stem 12 carrying a conically shaped flange 15 intermediate its end that rests in a pocket 16 at the outer side of the opening 14 within the tire shoe, the threaded end 13 of the terminal stem 12 being locked in the rim 7 by the nut 17. A disk head 18 is carried by the end of the stem 12 within the tire, the disk head 18 and conical flange 15 constituting electrical terminals.

A switch arm 19 shown in detail in Figure 4 as having an offset end 20 provided with apertures 21 is mounted upon the inner face of the wheel rim 7 by means of anchor screws 22 so that the switch arm 19 is spaced from the wheel rim 7 to provide a pocket 23 in which the contact terminals 15 and 18 are disposed, the switch arm 19 being engaged with the outer face of the inner wall of the inner tube 6 for holding the same in an inwardly arched position as shown at 6ª. The free end of the switch arm 19 is bent upon itself as at 24 with the return-bent portion slotted to provide a fork 25 straddling the stem 12 of the terminal and normally positioned between the contact members 15 and 18. The normal position of the fork 25 midway of the contact members 15 and 18 and the tensioning of the resilient switch arm 19 is accomplished by the adjusting screw 26 threaded through the rim 7 and engaged with said switch arm, adjustment of the screw 26 determining air pressure within the tires.

An electric conductor 27 has one end attached to the threaded end 13 of the terminal stem 12 while the other end of the conductor 27 carries a carbon brush contact 28 mounted in a guide 29 carried by the flange 9, the carbon contact 28 being in wiping engagement with the brake drum 10. A conductor wire 30 extends from the brake drum 10 to the source of electrical energy 31 and from said source 31, a wire 32 extends to a signal lamp 33 on the instrument board 34 of the motor vehicle, the other wire 35 from said lamp 33 being ground as at 36 while the mounting of the switch arm 19 upon the wheel rim 7 forms the other ground for the circuit.

When the pneumatic tire has been inflated to the desired pressure, the fork 25 of the switch arm 19 is positioned midway the contact elements 15 and 18 of the terminal 12, but should pressure in the tire fall below a predetermined amount, the arched portions 6ª of the inner tube 6 will stretch and flex to permit the fork 25 of the switch arm 19 to move into engagement with the contact element 18 for closing the circuit through the storage battery or source of energy to the signal lamp 33 and ground. In a similar manner, should the pneumatic develop excessive conditions due to heat or other causes, the arched portion 6ª of the inner tube would bear with greater force on the switch arm 19 and move the fork 25 of the switch arm into engagement with the contact element 15 and thereby close the circuit to the signal lamp.

From the above detailed description of the invention, it is believed that the construction and operation thereof will at once be apparent, and while there is herein shown and described the preferred embodiment of the invention, it is nevertheless to be understood that minor changes may be made therein, such as will fall within the scope of the invention as claimed.

I claim:

In a pressure operated switch adapted for placement between the wheel rim and inner tube of a pneumatic tire, a switch device including a pair of terminals, a tensioned switch arm engaged by the inner tube and having a switch blade interposed between the terminals, said terminals comprising a stem anchored in the rim with the terminals disposed between the rim and inner tube, said switch arm having one end anchored to the rim and the other end offset from the rim and engaged with the inner tube to provide a pocket between the inner tube and rim for the mounting of the terminal, and a screw device threaded through the rim and engageable with the switch arm adjacent the anchored end thereof for setting the normal position of the switch blade relative to the terminals.

HOWARD L. HULL.